(12) United States Patent
Ljolje et al.

(10) Patent No.: US 9,053,704 B2
(45) Date of Patent: Jun. 9, 2015

(54) SYSTEM AND METHOD FOR STANDARDIZED SPEECH RECOGNITION INFRASTRUCTURE

(71) Applicant: Interactions LLC., Franklin, MA (US)

(72) Inventors: Andrej Ljolje, Morris Plains, NJ (US); Bernard S. Renger, New Providence, NJ (US); Steven Neil Tischer, Atlanta, GA (US)

(73) Assignee: Interactions LLC, Franklin, MA (US)

( * ) Notice: Subject to any disclaimer, the term of this patent is extended or adjusted under 35 U.S.C. 154(b) by 0 days.

(21) Appl. No.: 14/330,739

(22) Filed: Jul. 14, 2014

(65) Prior Publication Data

US 2014/0324430 A1 Oct. 30, 2014

Related U.S. Application Data

(63) Continuation of application No. 14/018,808, filed on Sep. 5, 2013, now Pat. No. 8,781,831, which is a continuation of application No. 13/762,978, filed on Feb. 8, 2013, now Pat. No. 8,532,992, which is a continuation of application No. 12/618,371, filed on Nov. 13, 2009, now Pat. No. 8,374,867.

(51) Int. Cl.
*G10L 15/06* (2013.01)
*G10L 15/065* (2013.01)
*G10L 15/07* (2013.01)

(52) U.S. Cl.
CPC .............. *G10L 15/065* (2013.01); *G10L 15/07* (2013.01); *G10L 15/063* (2013.01)

(58) Field of Classification Search
USPC .............. 704/222, 244, 257, 9, 10, 243, 250, 704/231, 235, 270, 255, 247
See application file for complete search history.

(56) References Cited

U.S. PATENT DOCUMENTS

| | | | |
|---|---|---|---|
| 6,088,669 A | 7/2000 | Maes | |
| 6,343,267 B1 * | 1/2002 | Kuhn et al. | 704/222 |
| 7,209,881 B2 | 4/2007 | Yoshizawa et al. | |
| 8,155,961 B2 * | 4/2012 | Tian | 704/257 |
| 2005/0137866 A1 * | 6/2005 | Dow et al. | 704/244 |

* cited by examiner

*Primary Examiner* — Huyen Vo
(74) *Attorney, Agent, or Firm* — Fenwick & West LLP

(57) ABSTRACT

Disclosed herein are systems, methods, and computer-readable storage media for selecting a speech recognition model in a standardized speech recognition infrastructure. The system receives speech from a user, and if a user-specific supervised speech model associated with the user is available, retrieves the supervised speech model. If the user-specific supervised speech model is unavailable and if an unsupervised speech model is available, the system retrieves the unsupervised speech model. If the user-specific supervised speech model and the unsupervised speech model are unavailable, the system retrieves a generic speech model associated with the user. Next the system recognizes the received speech from the user with the retrieved model. In one embodiment, the system trains a speech recognition model in a standardized speech recognition infrastructure. In another embodiment, the system handshakes with a remote application in a standardized speech recognition infrastructure.

20 Claims, 4 Drawing Sheets

SYSTEM AND METHOD FOR STANDARDIZED SPEECH RECOGNITION INFRASTRUCTURE

PRIORITY INFORMATION

The present application is a continuation of U.S. patent application Ser. No. 14/018,808, filed Sep. 5, 2013, which is a continuation of U.S. patent application Ser. No. 13/762,978, filed Feb. 8, 2013, now U.S. Pat. No. 8,532,992, issued Sep. 10, 2013, which is a continuation of U.S. patent application Ser. No. 12/618,371, filed Nov. 13, 2009, now U.S. Pat. No. 8,374,867, issued Feb. 12, 2013, the contents of which are incorporated herein by reference in their entirety.

BACKGROUND

1. Technical Field

The present disclosure relates to speech recognition and more specifically to speech recognition based on standardized speech models.

2. Introduction

As automatic speech recognition (ASR) systems and devices become more widespread, ASR systems or applications recognize speech using their own recognition models. In principle, all models are trained from human transcriptions, but are adapted from either human or machine transcriptions. In recent years, however, even training can be done with large amounts of untranscribed speech, such as recognition output, to augment a relatively small amount of transcribed speech. Each system or application accommodates a particular speaker with either a generic model or with an application-specific and speaker-specific model. One application can develop a very detailed and accurate recognition model for a particular speaker in a particular environment, but other applications do not have access to and cannot benefit from those improvements. Further, each ASR application is typically incompatible with the model format of other ASR applications.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and computer-readable storage media for selecting a speech recognition model in a standardized speech recognition infrastructure. The method embodiment causes a computing device to first receive speech from a user. If a supervised speech model associated with the user is available, the method causes the computing device to retrieve the supervised speech model. If the supervised speech model is unavailable and if an unsupervised speech model associated with the user is available, the method causes the computing device to retrieve the unsupervised speech model. If the supervised speech model and the unsupervised speech model are unavailable, the method causes the computing device to retrieve a generic speech model associated with the user. Then the method causes the computing device to recognize the received speech from the user with the retrieved model.

All or some of the supervised speech model, the unsupervised speech model, and the generic speech model can be standardized speech models. At least one of the supervised speech model, the unsupervised speech model, and the generic speech model can be publicly available. In one aspect, the method further causes the computing device to adapt the retrieved model based on the recognized speech. Speech models can be reused when recognizing later received speech. The supervised speech model, the unsupervised speech model, and the generic speech model can each be generated on different devices. Either the supervised speech model or the unsupervised speech model can be represented as a set of differences from a base speech model. Recognizing the received speech from the user can be performed off-line at a later time after the speech is received. One possible application of this method is identifying voice commands in the recognized speech to control elements of a game based on the identified voice commands. Any or all of these variations can be applied to the other embodiments disclosed herein.

Also disclosed are systems, methods, and computer-readable storage media for training a speech recognition model in a standardized speech recognition infrastructure. The system includes a processor and various modules configured to control the processor. The system first receives speech from a user and makes a determination whether to apply supervised training or unsupervised training. If the determination is to apply supervised training, the system further determines whether available data, including transcriptions, are sufficient to build a new model. If available data is sufficient to build a new model, the system builds the new model. If available data is not sufficient to build the new model, the system selects a first existing model, and generates a first adapted model based on transformations generated from the selected first existing model based on the received speech and associated transcriptions.

The new model, the first existing model, and the first adapted model can be standardized speech models. At least one of the models can be publicly available. In one aspect, the first existing model is a general model and the first adapted model is the result of applying the transformations to the first existing model. The system can recognize later received speech based on the first adapted model. Any or all of these variations can be applied to the other embodiments disclosed herein.

Further disclosed are systems, methods, and computer-readable storage media for handshaking with a remote application in a standardized speech recognition infrastructure. The system initiates a voice call with a remote application, and determines if the remote application can apply standardized speech recognition models. If the remote application can apply standardized speech recognition models, the system transmits a speaker specific model to the remote application and instructs the remote application to recognize speech with the transmitted model. If the remote application can not apply standardized speech recognition models, the system determines if the remote application can apply transformations of a standard speech recognition model. If the remote application can apply transformations of the standard speech recognition model, the system transmits transformations of a generic model to the remote application, and instructs the remote application to recognize speech based on the transmitted transformations. If the remote application can not apply transformations of the standard speech recognition model, the system instructs the remote application to recognize speech with the generic model. Speaker specific models and transformations can each be generated on different devices. The system can instruct the remote application to perform self-adaption on the transmitted speaker specific model or the transformations. Self-adaptation means using unsupervised speech (i.e., recognition output) to adapt the model and use the new adapted model to recognize (rescore N-best, lattices, etc.) the same speech that was used to adapt it. The system can be an edge device in a communications network. In one variation the remote application is a game which identifies voice commands in recognized speech and controls elements of the game based on the identified voice commands. The generic model and the speaker specific model can be publicly available. Any or all of these variations can be applied to the other embodiments disclosed herein.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

One important concept in this disclosure is standardization. All aspects of the speech recognition that perform adaptation are standardized, including speech, transcriptions, dictionaries, model structures, features, model transformations, etc. Every device and/or service needs to know exactly what those data structures mean and in what format(s) to expect the data structures. Such standardization can be a mandated standard, such as from a standards body, or a de facto standard. In one variation, the system, method, or computer-readable storage media recognize multiple standards and determine or detect which of the standards applies to a given situation.

Speech models can be trained using supervised or unsupervised adaptation, based on human transcription or recognition output, respectively. Throughout this disclosure, "unsupervised speech model" refers to speech models trained using unsupervised adaptation and "supervised speech model" refers to speech models trained using supervised adaptation. In many instances, standardized speech models can be trained based on a mixture of both supervised and unsupervised adaptation.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
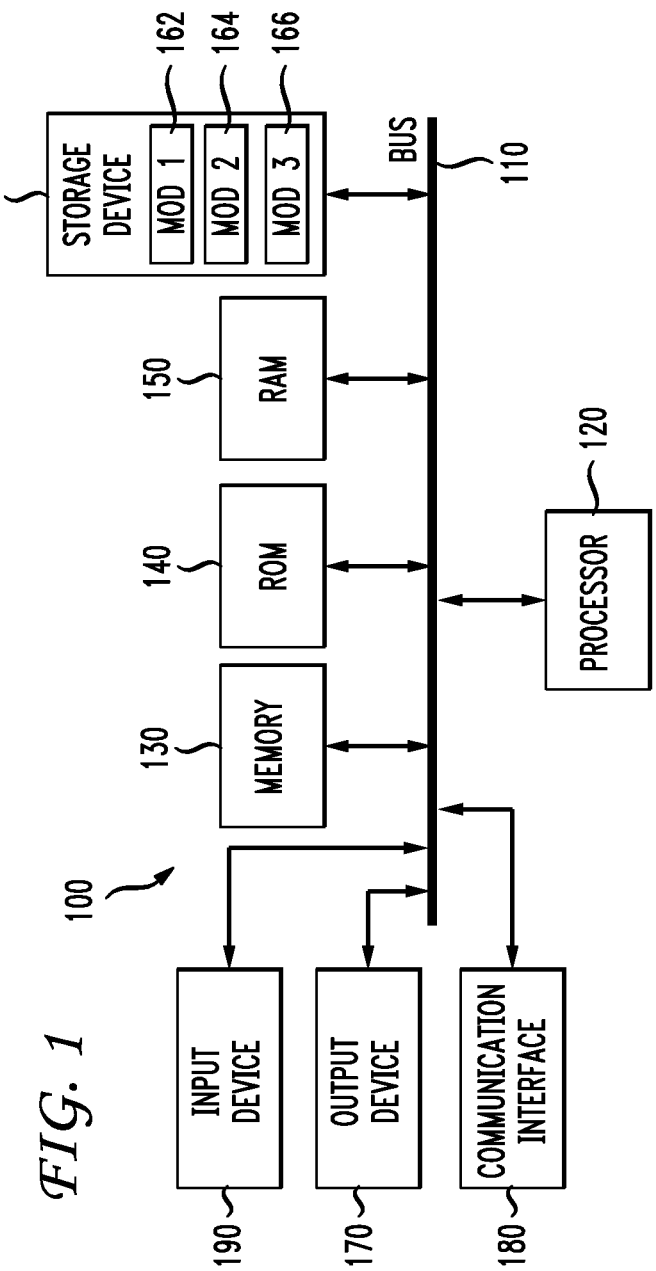
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
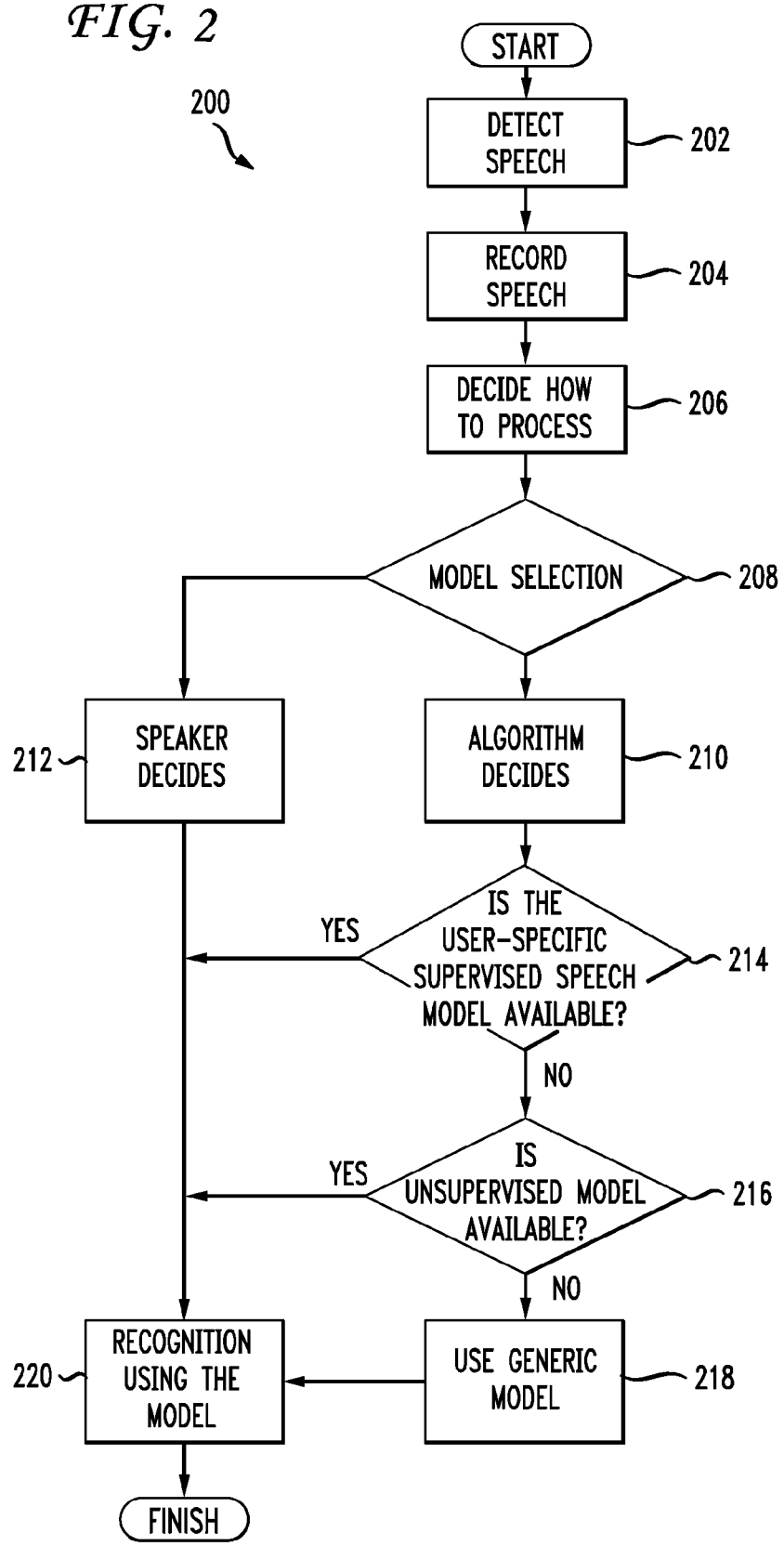
FIG. 2 illustrates a model selection flowchart.
Figure 3:
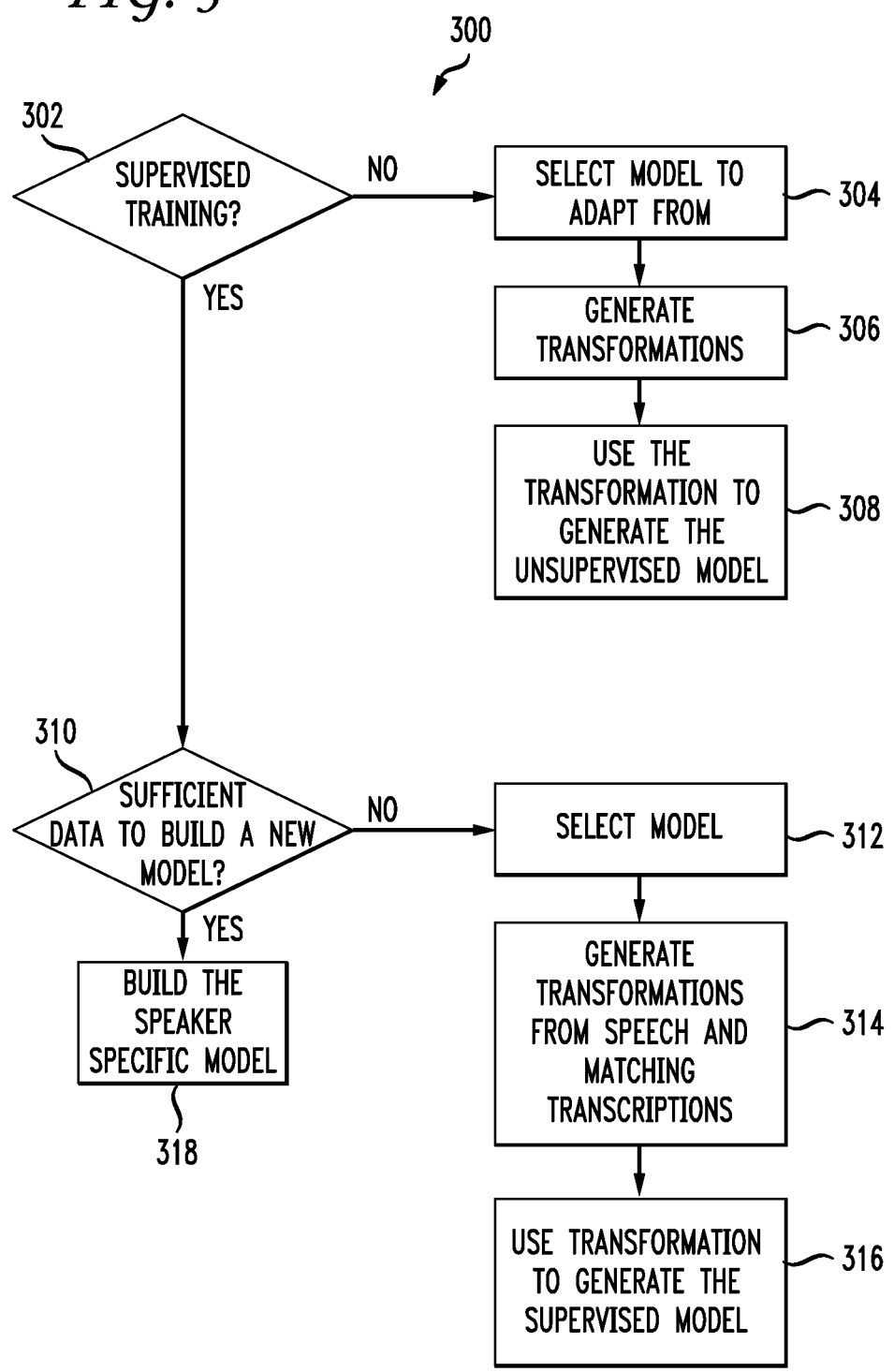
FIG. 3 illustrates a model training flowchart.
Figure 4:
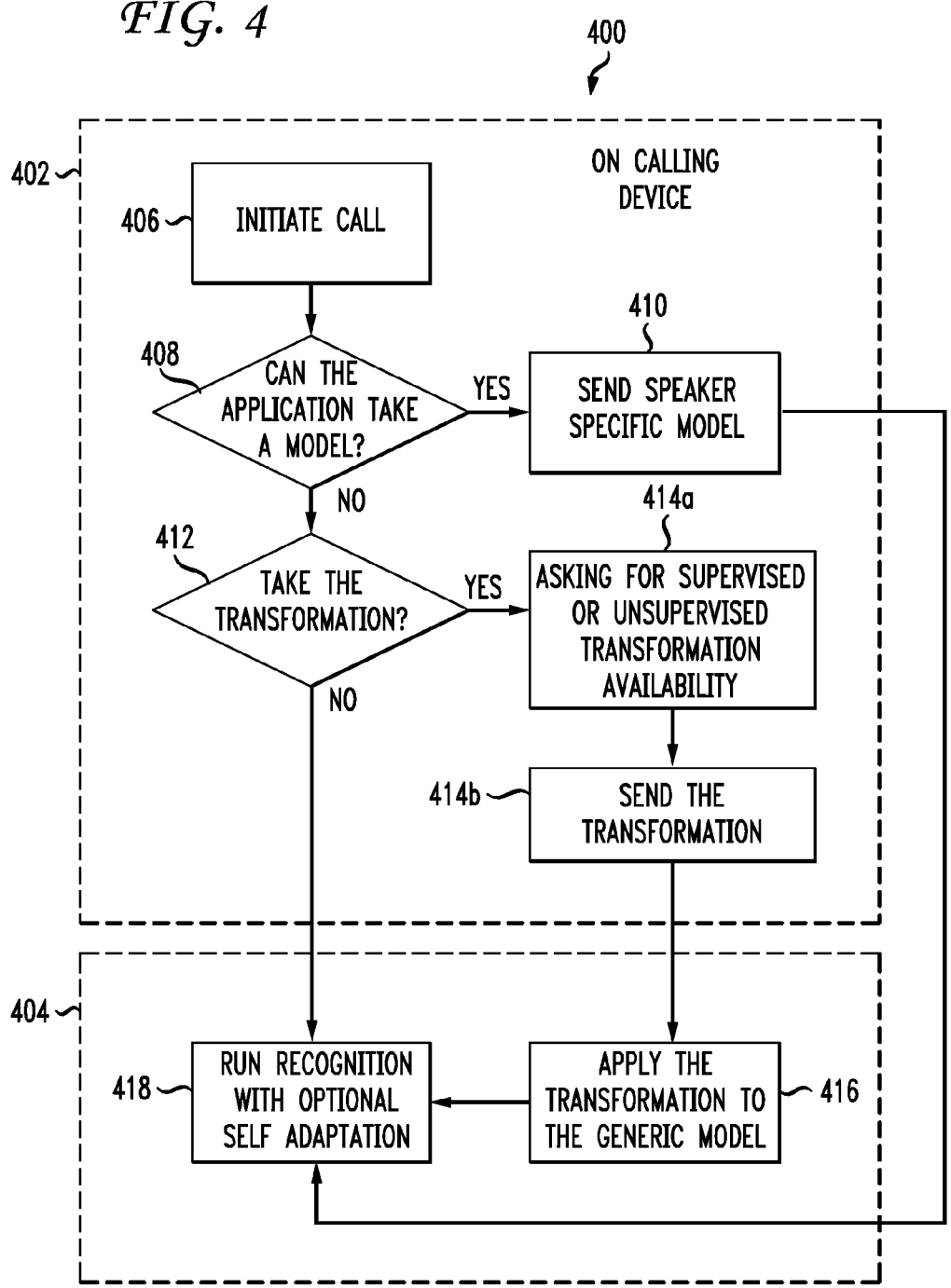
FIG. 4 illustrates a remote application handshake flowchart.

Having disclosed some basic system components, the disclosure now turns to the exemplary flowcharts shown in FIGS. 2-4. For the sake of clarity, the methods and computer-readable storage media are discussed in terms of an exemplary system 100, as shown in FIG. 1, configured to practice the method.

FIG. 2 illustrates a flowchart 200 outlining system steps for selecting a speech recognition model in a standardized speech recognition infrastructure. The system 100 receives speech from a user. This step can include detecting speech 202 and/or recording speech 204. Then the system decides how to process the detected speech 206. The system starts a model selection 208 process. In one aspect, the speaker indicates which model the system should use 212. In another aspect, an algorithm decides 210 which model the system should use. If a speaker-specific supervised speech model associated with the user is available 214, the system retrieves the speaker-specific supervised speech model. If the supervised speech model is unavailable and if an unsupervised speech model associated with the user is available 216, the system retrieves the unsupervised speech model. If the supervised speech model and the unsupervised speech model are unavailable, the system retrieves a generic speech model 218 which may or may not be associated with the user. Then the system recognizes the received speech from the user with the retrieved model 220.

All or some of the supervised speech model, the unsupervised speech model, and the generic speech model can be standardized speech models. At least one of the supervised speech model, the unsupervised speech model, and the generic speech model can be publicly available, such as on a website or in a publicly available repository. A centralized server or service can provide a storage repository for speech models, or users can store speech models in a publicly available space of their own. These publicly available speech models can be addressed in a similar manner to a web site URL, such as http://speechmodels.com/user1. A mobile device, such as a smartphone having a web server, can make a locally stored speech model publicly available. In the case of a publicly available repository of speech recognition models, the repository can allow users to retrieve, adapt, commit changes, remove, adjust permissions, set device- or application-specific preferences, and/or personalize speech models directly or through a management interface.

In one aspect, the system further adapts the retrieved model based on the recognized speech. Speech models can be reused when recognizing later received speech. The supervised speech model, the unsupervised speech model, and the generic speech model can each be generated on different devices. At least one of the supervised speech model and the unsupervised speech model can be represented as a set of differences from a base speech model. Recognizing the received speech from the user can be performed off-line at a later time after the speech is received. The method can further cause the computing device to identify voice commands in the recognized speech and control elements of a game based on the identified voice commands. Any or all of these variations can be applied to the other embodiments disclosed herein.

FIG. 3 illustrates a model training flowchart 300. A system, including a processor, practicing this method includes various modules configured to control the processor to perform certain steps. The system receives speech from a user, either directly or through an external device. The system then makes a determination 302 whether to apply supervised training or unsupervised training. If the system decides to apply supervised training, the system further determines whether available data, including transcriptions, are sufficient to build a new model 310. If available data is sufficient to build a new model, the system builds the new speaker-specific model based on the available data 318.

If, on the other hand, available data is not sufficient to build the new model, the system selects an existing model 312, generates a first adapted model based on transformations generated from the selected model based on the received speech and associated transcriptions 314, and uses the transformations to generate the supervised model 316. If the system decides to apply unsupervised training, the system selects a different existing model 304, generates an adapted model based on transformations generated from the selected existing model based on the received speech 306, and uses the transformations to generate the unsupervised model 308.

Each of the speech models discussed in relation to FIG. 3 can be standardized speech models. At least one of the speech models can be publicly available. The existing model can be general models, and the adapted models can be sets of transforms from an existing model. The system can further recognize later received speech based on one or more of the adapted models.

FIG. 4 illustrates a remote application handshake flowchart 400. This flowchart can be embodied as a method, system, or a computer-readable storage medium having instructions for controlling a computing device. The flowchart 400 includes two dashed boxes. The first dashed box 402 represents actions that occur on a calling device, such as a telephone, smartphone, computer using Voice over IP, or other edge device in a communications network. The edge device or phone can be online with a network, such as a cellular network, and can intermittently connect to a speech application. The edge device can include its own storage, processor, data bus, etc. In one aspect, in the beginning the edge device or the remote application only has access to a generic speech model, so recognition must be based on the generic speech model. Over time, as the user speaks and the system gathers speech information, the system develops a speech model for you as an entirely separate speech model or as a set of transformations from the generic speech model. Then the system can select different models for a particular user or the user can select the model that the user feels works best. For example, in a noisy environment, the system can automatically select a model suited to the noisy environment.

The second dashed box 404 represents actions that occur in a remote application. The remote application can be a dedicated device and/or a software application running on one or more remote computing devices. A system configured to perform the handshake according to the flowchart 400 initiates a voice call with a remote application 406. The system then determines if the remote application 404 can apply standardized and/or commoditized speech recognition models 408. If the remote application 404 can apply standardized speech recognition models, then the system transmits a speaker specific model to the remote application 410 and instructs the remote application to recognize speech with the transmitted model 418. If the remote application can not apply standardized speech recognition models, the system determines if the remote application 404 can apply transformations of a standard speech recognition model 412. If the remote application 404 can apply transformations of the standard speech recognition model, the system asks for or checks the availability of supervised or unsupervised transformation 414a and transmits at least one suitable transformation 414b, which can include an indication to which generic model to apply the transformation, and instructs the remote application to apply the transmitted transformations to the generic model 416 in order to recognize speech based on the transmitted transformations 418. The transformations can be significantly smaller than an entire model. Transformations can be specific to a particular speech model, such that a set of transformations can include an indication of which speech model the set of transformations is associated with and intended to modify. If the remote application 404 can not apply transformations of the standard speech recognition model, the system instructs the remote application 404 to recognize speech with the generic model 418.

In one aspect, the speaker specific model and the transformations are each generated on different devices. The transformations can include speech statistics leading to the creation of the transformations. The remote application 404 can perform self-adaption on the transmitted speaker specific model or the transformations. The calling device 402 can instruct the remote application 404 to perform the self-adaptation or the remote application 404 can perform self-adaptation without instructions. The quality and/or frequency of self-adaptation can be based on amounts of processed speech, the available processing capacity in the remote application 404, and/or other factors. During self-adaptation, the system can assign different weight to certain data, such as assigning greater weight to newer data if the voice changes or assigning lower weight to data in which the speaker has a cold.

The remote application 404 can be a game which identifies voice commands in recognized speech and controls elements of the game based on the identified voice commands. The generic model and the speaker specific model can be publicly available. In the case of a game, a speaker specific speech model can be stored as part of a player's online game profile and the handshake process can occur as part of a game initialization.

In one aspect, the system selects speech models without user knowledge or intervention so the user makes little or no effort. In another aspect, the user provides feedback to guide the present recognition and/or later recognition. For example, the user can provide detailed feedback directed to a specific misrecognition event or the user can provide general, high-level feedback (such as a thumbs up or a thumbs down). The system can perform speech model selection and adaptations as part of an opt-in service where users review the recognition and provide feedback indicating how well the system recognizes speech using the selected models.

The system can process speech off-line or in real time. In one variation, the system operates in a conference call between different users' devices. Each user device records and transcribes its own part of the conference call in real time or off-line using a detailed speech model for the user, and uploads its own part of the transcript to a central server or to the other users' devices. Then the receiving device can inspect the time stamps and labels identifying a particular speaker and assemble the received transcript portions into a master transcript. In this manner, the system provides for distributed parallel processing of the speech recognition to devices which have customized speech models in a standardized, commoditized form specific to each user. Smartphones are well-suited to this approach because they are network-connected and can send and receive data with each other.

Each user's device can create standardized speech recognition models for phone users over time in order preemptively tune them before they are needed. The device can constantly refine these models without user intervention. When a speech recognition application is needed, the system can retrieve and implement this finely tuned model nearly instantly either directly, or by sending it along as a collection of transformations of a standardized speech model.

In one variation, systems practicing the principles disclosed herein share the speech recordings and the transcriptions generated by a human (supervised) or recognition output (unsupervised) approach. For example, a user uses speech to book a flight. The remote system records the speech and performs recognition with the best models it has for the task. At the end of the task, the system can use both the speech and the recognition output locally for adaptation, but more importantly the system can return adapted models to the users "home" device or location such as a cell phone, service provider, or a personal computer. The system can return the adapted models to the "home" device or location via a cell phone connection or other wired and/or wireless connection. The "home" device or location can adapt the received models in conjunction with the speech from all the applications that the user has accessed in the past.

The remote application can send some of its speech to the "home" device to be transcribed, and at the next contact by the user the "home" device can provide those transcriptions in order to upgrade existing models using supervised adaptation or build new models.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A computer-implemented method comprising:
    initiating a voice call with a remote application;
    determining, by processor-executable instructions executed by a processor, whether the remote application can apply standardized speech recognition models;
    when the remote application can apply the standardized speech recognition models:
        transmitting a speaker specific model to the remote application; and
        the processor-executable instructions when executed by the processor instructing the remote application to recognize speech with the transmitted speaker specific model; and
    when the remote application can not apply standardized speech recognition models:
        the processor-executable instructions when executed by the processor determining whether the remote application can apply transformations of a standard speech recognition model.

2. The computer-implemented method of claim 1, further comprising:
    when the remote application can apply transformations of the standard speech recognition model:
        transmitting transformations of a generic model to the remote application; and
        instructing the remote application to recognize speech based on the transmitted transformations; and
    when the remote application can not apply transformations of the standard speech recognition model, instructing the remote application to recognize speech with the generic model.

3. The computer-implemented method of claim 1, wherein the speaker specific model is generated on a first device and the transformations are generated on a second device distinct from the first device.

4. The computer-implemented method of claim 1, further comprising instructing the remote application to perform self-adaptation based on one of the transmitted speaker specific model and the transformations.

5. The computer-implemented method of claim 1, wherein the transmitting occurs using an edge device in a communications network.

6. The computer-implemented method of claim 1, wherein the remote application is a game, and wherein the game identifies voice commands in recognized speech and controls elements of the game based on the voice commands.

7. The computer-implemented method of claim 1, wherein the generic model and the speaker specific model are publicly available.

8. The computer-implemented method of claim 1, wherein a network client authenticates the speech before instructing the remote application to recognize the speech.

9. A system comprising:
    a processor; and
    a computer-readable storage medium having instructions stored which, when executed by the processor, cause the processor to perform operations comprising:
    initiating a voice call with a remote application;
    determining if the remote application can apply standardized speech recognition models;
    when the remote application can apply the standardized speech recognition models:
        transmitting a speaker specific model to the remote application, and
        instructing the remote application to recognize speech with the transmitted model;
    when the remote application can not apply standardized speech recognition models:
        determining if the remote application can apply transformations of a standard speech recognition model.

10. The system of claim 9, the computer-readable storage medium having additional instructions stored which result in operations comprising:

when the remote application can apply transformations of the standard speech recognition model:

transmitting transformations of a generic model to the remote application, and instructing the remote application to recognize speech based on the transmitted transformations; and when the remote application can not apply transformations of the standard speech recognition model, instructing the remote application to recognize speech with the generic model.

11. The system of claim 9, wherein the speaker specific model is generated on a first device and the transformations are generated on a second device distinct from the first device.

12. The system of claim 9, the computer-readable storage medium having additional instructions stored which result in operations comprising instructing the remote application to perform self-adaptation based on one of the transmitted speaker specific model and the transformations.

13. The system of claim 9, wherein the transmitting occurs using an edge device in a communications network.

14. The system of claim 9, wherein the remote application is a game, and wherein the game identifies voice commands in recognized speech and controls elements of the game based on the voice commands.

15. The system of claim 9, wherein the generic model and the speaker specific model are publicly available.

16. The system of claim 9, wherein a network client authenticates the speech before instructing the remote application to recognize the speech.

17. A computer-readable storage device having instructions stored which, when executed by a computing device, cause the computing device to perform operations comprising:

initiating a voice call with a remote application;

determining if the remote application can apply standardized speech recognition models;

when the remote application can apply the standardized speech recognition models:

transmitting a speaker specific model to the remote application, and instructing the remote application to recognize speech with the transmitted model; and when the remote application can not apply standardized speech recognition models:

determining if the remote application can apply transformations of a standard speech recognition model.

18. The computer-readable storage device of claim 17, having additional instructions stored which result in operations comprising:

when the remote application can apply transformations of the standard speech recognition model:

transmitting transformations of a generic model to the remote application, and instructing the remote application to recognize speech based on the transmitted transformations; and when the remote application can not apply transformations of the standard speech recognition model, instructing the remote application to recognize speech with the generic model.

19. The computer-readable storage device of claim 17, wherein the speaker specific model is generated on a first device and the transformations are generated on a second device distinct from the first device.

20. The computer-readable storage device of claim 17, having additional instructions stored which result in operations comprising instructing the remote application to perform self-adaptation based on one of the transmitted speaker specific model and the transformations.

* * * * *